Patented May 13, 1924.

1,494,096

UNITED STATES PATENT OFFICE.

HENRY BERLIN, OF CARNEYS POINT, AND LEON ADLER, OF PENNS GROVE, NEW JERSEY, ASSIGNORS TO E. I. DU PONT DE NEMOURS & COMPANY, OF WILMINGTON, DELAWARE, A CORPORATION OF DELAWARE.

PROCESS OF SEPARATING NAPHTHOL-SULPHONIC ACIDS.

No Drawing.   Application filed February 24, 1920. Serial No. 360,880.

*To all whom it may concern:*

Be it known that we, HENRY BERLIN and LEON ADLER, citizens of Russia and the United States, respectively, and residents of Carneys Point and Penns Grove, respectively, in the county of Salem and State of New Jersey, have invented a certain new and useful Process of Separating Naphthol-Sulphonic Acids, of which the following is a specification.

This invention relates to the separation of 2-naphthol-6,8-disulphonic acid from certain other naphthol-sulphonic acids, and comprises converting the acid which is first to be removed from solution into a relatively insoluble salt, and then causing said salt to crystallize by cooling the solution.

When beta-naphthol is treated with more than one part of concentrated sulphuric acid, preferably of 66° Be'., at temperatures in the neighborhood of 100° C. until the point of sulphonation desired is attained, either of the following mixtures containing G-acid may be obtained depending on the duration of the treatment:—

1. 2-Naphthol-6-sulphonic acid } Schaeffer's acid
   2-Naphthol-6,8-disulphonic acid } G-acid
2. 2-Naphthol-3,6-disulphonic acid } R-acid
   2-Naphthol-6,8-disulphonic acid } G-acid
3. 2-Naphthol-6-monosulphonic acid } Schaeffer's acid
   2-Naphthol-3,6-disulphonic acid } R-acid
   2-Naphthol-6,8-disulphonic acid } G-acid Any one of these acids may be referred to generically as a 2,6-naphthol-sulphonic acid.

Methods heretofore used to separate the G-salt from any of the above mixtures are not satisfactory for obtaining sufficiently pure G-salt.

One object of our invention is to provide a convenient method for separating the salt of G-acid in a comparatively pure condition from R-acid or Schaeffer's acid or their salts. We have found that the potassium salt of G-acid is much less soluble than the potassium salt of R-acid or of Schaeffer's acid, whereas the sodium salt of G-acid is more soluble than the sodium salt of R-acid or of Schaeffer's acid. Our process of separation, in which these reactions have been applied, may be stated briefly as comprising the addition of a salt of one of the two chief alkali-metals to a hot solution containing G-acid, R-acid, and in some cases Schaeffer's acid, cooling to crystallize out a salt of one of said acids, heating the remaining solution, adding thereto a salt of the other of said alkali-metals, cooling to crystallize out a salt of another one of said acids, and then filtering to remove said last mentioned salt.

It will be evident that two alternative procedures may be followed in carrying out the process described generically above: The G-salt may be separated first, or last. These two procedures may be described in somewhat greater detail as follows:—

I. *Separation of G-salt first.*—The product resulting from the sulphonation of beta-naphthol is (1) treated at a temperature of from about 70 to 90° C. with an aqueous, or other suitable, solution of KCl, $K_2SO_4$, or other suitable potassium salt or potassium hydroxide.  (2) The resulting solution is cooled and filtered to recover the precipitated potassium salt of G-acid.  (3) The filtrate, after heating, is saturated with NaOH, NaCl, $Na_2SO_4$, or any other suitable sodium salt.  (4) The solution obtained is then cooled and filtered to recover the precipitate which now contains the remaining components of the original mixture in the form of their salts.

II. *Separation of G-salt last.*—The product resulting from the sulphonation of beta-naphthol is (1) treated with NaCl, $Na_2SO_4$, or other suitable salt, except a potassium salt, in an aqueous or other suitable solution.  (2) The resulting solution is cooled to cause precipitation of R-salt or Schaeffer's salt or both depending upon the nature of the sulphonation product, and filtered to recover the precipitate.  (3) The filtrate from the last step, after heating, is treated with KCl, $K_2SO_4$, or other suitable potassium compound; and (4) the solution so obtained is cooled and filtered to recover the potassium salt of G-acid which has been precipitated.

We have found that any one of a large number of salts may be used in place of the sodium salts in precipitating R-acid and Schaeffer's acid; thus salts of the alkaline earth metals, calcium and barium, are the equivalents of the sodium salts. The potassium salts, however, are not suitable for this purpose.

Our new process may be illustrated by the following specific example, according to which the G-salt is separated first.

The product resulting from the sulphonation of one part of beta-naphthol with four parts 66° Bé. sulphuric acid, is dissolved in 6 parts of water. 1.2 parts of $K_2SO_4$ are added to this solution at 80–85° C., with stirring. After the $K_2SO_4$ has dissolved, the mixture is cooled to room temperature (20–22° C.) and after standing for a sufficient length of time, the G-salt that precipitates is recovered by filtration. The filtrate is then saturated with $Na_2SO_4$, at 90° C., and cooled to precipitate the remaining compounds which may be either R-salt or Schaeffer's salt, or both. This last precipitate is filtered off.

We have described above the successive separation and isolation in a relatively pure condition of G-salt on the one hand and R-salt or a mixture of R-salt and Schaeffer's salt on the other, since all the above salts have considerable value. Our invention, however, is not limited to a combination of these successive steps, but includes broadly the separation of either G-salt or R-salt by treatment, with the appropriate precipitating agent, of a solution containing both of these salts.

It will be understood that various changes may be made in the process as above described without departing from the spirit of our invention.

We claim:

1. The process of separating 2-naphthol-6, 8-disulphonic acid from another 2, 6-naphthol-sulfonic acid obtainable by heating beta-naphthol with concentrated sulphuric acid, which comprises treating a hot solution containing said sulphonic acids with a salt of one of the two chief alkali metals, cooling the solution and separating the resulting precipitate, treating the remaining solution at an elevated temperature with a salt of the other of said alkali metals, and again cooling and separating the resulting precipitate.

2. The process of separating 2-naphthol-6,8-disulphonic acid from another 2,6-naphthol-sulfonic acid obtainable by heating beta-naphthol with concentrated sulphuric acid, which comprises treating a hot solution containing said sulphonic acids with a potassium salt, cooling the solution and separating the resulting precipitate containing the potassium salt of 2-naphthol-6,8-disulphonic acid, treating the remaining solution at an elevated temperature with a sodium salt, again cooling the solution to precipitate the sodium salts of other 2,6-naphthol-sulphonic acids, and separating the precipitate from the remainig solution.

3. The process of separating 2-naphthol-6,8-disulphonic acid from another 2,6-naphthol-sulphonic acid obtainable by heating beta-naphthol with concentrated sulphuric acid, which comprises treating a hot solution containing said sulphonic acids with a potassium salt, cooling the solution to about 20° C. and filtering to recover the potassium salt of 2-naphthol-6,8-disulphonic acid, saturating the filtrate at a temperature of about 90° C. with a sodium salt, and cooling the saturated solution to precipitate the sodium salts of other 2,6-naphthol-sulphonic acids.

4. The process of isolating 2-naphthol-6,8-disulphonic acid from a solution containing said acid and at least one other naphthol-sulphonic acid obtainable by heating beta-naphthol with concentrated sulphric acid, which comprises adding to said solution at an elevated temperature a potassium compound capable of reacting with said first mentioned acid to form a potassium salt thereof, cooling the resulting solution to precipitate said salt, and separating the latter from the remaining solution.

5. The process of recovering 2,6-naphthol-sulphonic acids in the form of their salts which comprises dissolving in about 6 parts of water the product resulting from the sulphonation of one part of beta-naphthol with about 4 parts of 66° Bé. sulphuric acid, adding about 1,2 parts of potassium sulphate to the resulting solution at a temperature of from about 70 to 90° C. while agitating the solution, cooling the solution to about 20° C. to cause the potassium salt of 2-naphthol-6,8-disulphonic acid to precipitate, filtering off said precipitate, saturating the filtrate at an elevated temperature with a sodium salt, cooling the solution to precipitate the salts of other 2,6-naphthol-sulphonic acids which may be present, and filtering off the thus precipitated salts.

In testimony whereof we affix our signatures.

HENRY BERLIN.
LEON ADLER.